United States Patent
Fuller et al.

(10) Patent No.: US 8,159,991 B1
(45) Date of Patent: *Apr. 17, 2012

(54) MOBILE WLAN REPEATER SYSTEM

(75) Inventors: Mary Fuller, Stanford, CA (US);
Hedley Rainnie, Santa Clara, CA (US);
Eric Janofsky, Sunnyvale, CA (US)

(73) Assignee: Marvell International Ltd, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,194

(22) Filed: Sep. 12, 2011

Related U.S. Application Data

(62) Division of application No. 11/433,908, filed on May 12, 2006, now Pat. No. 8,018,888.

(51) Int. Cl.
*H04W 4/00* (2009.01)

(52) U.S. Cl. ...... 370/315; 370/310; 340/539.1; 340/933; 455/345

(58) Field of Classification Search ......... 370/310, 370/315; 455/345; 340/539.13, 933
See application file for complete search history.

(56) References Cited

U.S. PATENT DOCUMENTS

| | | |
|---|---|---|
| 2002/0194385 A1 | 12/2002 | Linder et al. |
| 2006/0019713 A1 | 1/2006 | Rokusek et al. |
| 2007/0201403 A1 | 8/2007 | Thome |
| 2008/0159245 A1 | 7/2008 | Benn et al. |

*Primary Examiner* — Pierre-Louis Desir

(57) ABSTRACT

A wireless local area network module including an input configured to receive a control signal, wherein the control signal indicates whether a vehicle is in a parked position. The wireless local area network module further includes a wireless local area network transceiver associated with the vehicle. The wireless local area network transceiver is configured to i) receive data packets via a first wireless communication channel, and ii) in response to the control signal indicating that the vehicle is in a parked position, repeat the data packets over the first wireless communication channel.

14 Claims, 6 Drawing Sheets

MOBILE WLAN REPEATER SYSTEM

The present disclosure is a divisional of U.S. application Ser. No. 11/433,908, filed on May 12, 2006.

FIELD

Background

The Internet is an increasing part of our lives. It is used at home to perform research, send and receive electronic mail, to play games, telecommute, and other such applications. In an effort to increase Internet accessibility, some individuals, businesses and/or government entities have installed wireless access points (WAP) or "Internet hotspots" that allow people to access the Internet with a wireless station (STA). Examples of STAs include laptop computers, palmtop computers, personal digital assistants (PDAs), hand-held gaming devices, and/or other such devices that can be equipped with a wireless local area network (WLAN) interface that communicates with the WAP.

Some cities, such as San Francisco, Calif., are being outfitted with a plurality of WAPs so that Internet access is practically ubiquitous throughout the city. However, such an effort requires a significant investment in WAPs along with additional and ongoing maintenance expenses. WLAN signals may be absorbed by dense structures, have limited range and may be limited to line-of-sight applications. It therefore becomes exponentially more expensive to provide a city with truly ubiquitous wireless Internet access since WAPs would need to be located in many locations that are practically shielded from the UHF and SHF bands. These locations include underground parking structures, basements, subway systems, around land masses, and so forth. Current federal rules also limit the transmitter power of WLANs in the aforementioned portions of the UHF and SHF bands to a fairly low value. Even under ideal RF propagation conditions, a city would need a large number of WAPs for a STA to move between contiguous Internet hotspots.

Referring now to FIG. 1, a WLAN 10 includes a WAP 12 that communicates with a distributed communication system 14 such as the Internet via a communication link 16. Communication link 16 can include a copper, fiber optic, wireless links, and/or the like. A STA 18 associates with WAP 12 via a wireless communication channel 20. WAP 12 and communication link 16 then complete a communication path between STA 18 and the distributed communication system 14.

Referring now to FIG. 2, a functional block diagram is shown that illustrates some of the challenges presented in establishing ubiquitous wireless access over a geographic area. A plurality of masses 22 represents buildings, land masses, and/or other barriers to the wireless communication channels 20 between WAPs 12 and STAs 18. A distance between the STA and the WAP also may present problems. A first WAP 12-1 communicates with distributed communication system 14 via a first communication link 16-1. A second WAP 12-2 communicates with distributed communication system 14 via a second communication link 16-2. A first STA 18-1 associates with a first WAP 12-1 via a wireless communication channel 20-1 that is unobstructed by one or more of masses 22. A second STA 18-2 associates with second WAP 12-2 via a wireless communication channel 20-2 that is unobstructed by one of masses 22.

A third STA 18-3 is unable to establish a wireless communication channel to nearby second WAP 12-2 since one of masses 22 lies in the way. Additional WAPs 12 such as a third WAP 12-3 would need to be installed within line-of-sight of third STA 18-3 to provide it with a link to distributed communication system 14. More WAPs would need to be provided to further extend coverage.

SUMMARY

In general, in one aspect, this specification discloses a wireless local area network module including an input configured to receive a control signal, wherein the control signal indicates whether a vehicle is in a parked position. The wireless local area network module further includes a wireless local area network transceiver associated with the vehicle. The wireless local area network transceiver is configured to i) receive data packets via a first wireless communication channel, and ii) in response to the control signal indicating that the vehicle is in a parked position, repeat the data packets over the first wireless communication channel.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
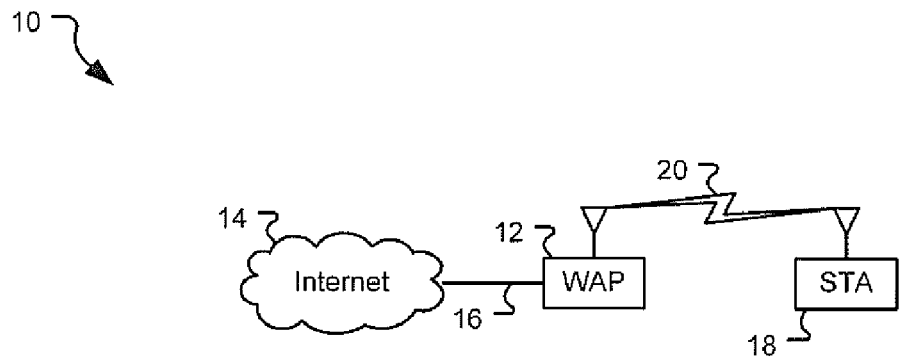
FIG. 1 is a functional block diagram of a WLAN of the prior art.
Figure 2:
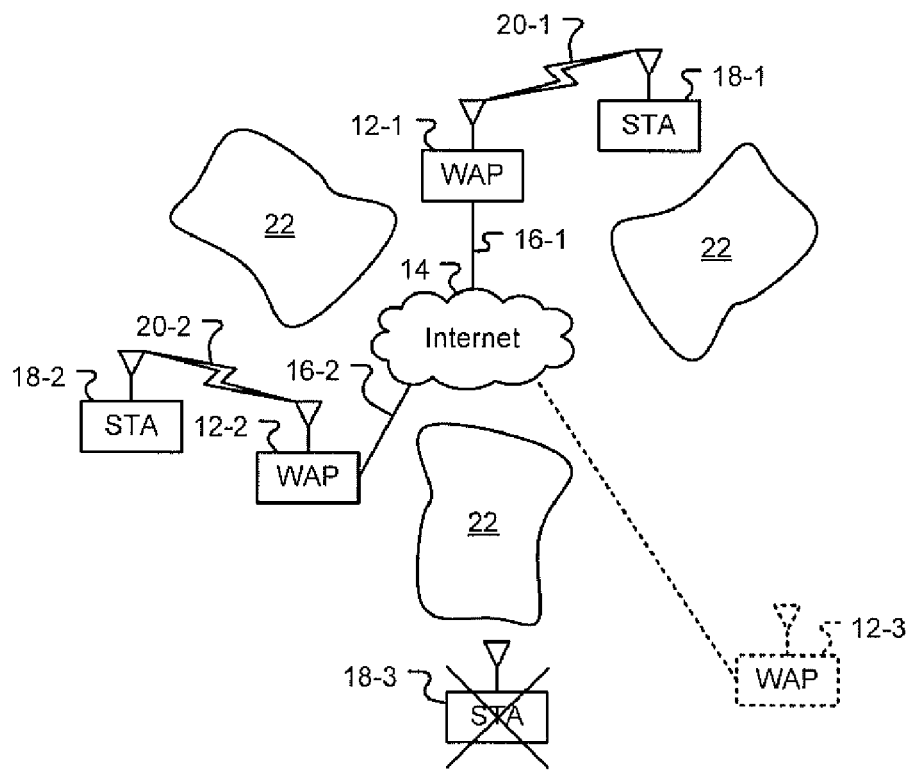
FIG. 2 is a functional block diagram of a geographical area that includes a WLAN of the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Mobile platforms such as automobiles, trucks, motorcycles and other vehicles tend to have a relatively high cost. Providing wireless Ethernet service to these vehicles will be a growing trend in the future. Access to a distributed communications system will be provided by wireless telephone systems and/or other large area wireless Ethernet services such as WiMax and the like. By incorporating additional network gear such as repeaters and access points in the mobile platforms, the mobile platforms can be used to extend wireless services to areas that are not already covered. The incremental cost added to the mobile platforms will be relatively low in relation to the overall price of the mobile platform.

For example, a first mobile platform may have a wireless telephone based data service and may periodically be within range of wireless hot spots. For example, the first mobile platform may be parked in a mall within range of a wireless hot spot. A second mobile platform may not have a wireless telephone based data service and may not be within range of the wireless hot spot. However, the second mobile platform may be within range of the first mobile platform. If the first mobile platform is not using the wireless links fully, the first mobile platform may act as either a repeater for the wireless hot spot or as an access point for the wireless telephone based service. Furthermore, since the wireless gear does not dissipate much power, it can be operated on battery power when the mobile platform is not operational. By using the first mobile platform in this manner, the second mobile platform will be provided wireless access that it would otherwise not have.

Furthermore, the second mobile platform may also act as a repeater for a third mobile platform. In such a scenario the second mobile platform repeats data packets that it receives from the first and third mobile platforms. The first mobile platform can be configured as a repeater if it is within range of the wireless hot spot. Alternatively, the first mobile platform can be configured as an access point that uses the wireless telephone based service to communicate with the Internet or other distributed communication system. The third mobile platform can then have wireless access via the first and second mobile platforms.

While the foregoing examples describe the first mobile platform in a parked position, the first, second and/or third mobile platforms can also be in motion. Furthermore, the availability of the wireless hot spots will come and go as the first mobile platform travels. Therefore, the first mobile platform may switch between using the telephone-based services and the wireless Ethernet-based services on an availability basis, a performance basis, a cost basis, and/or using any other criteria. As can be appreciated, as the number of mobile platforms with the network devices described above and below increases, the availability of wireless access will also increase.

Figure 3:
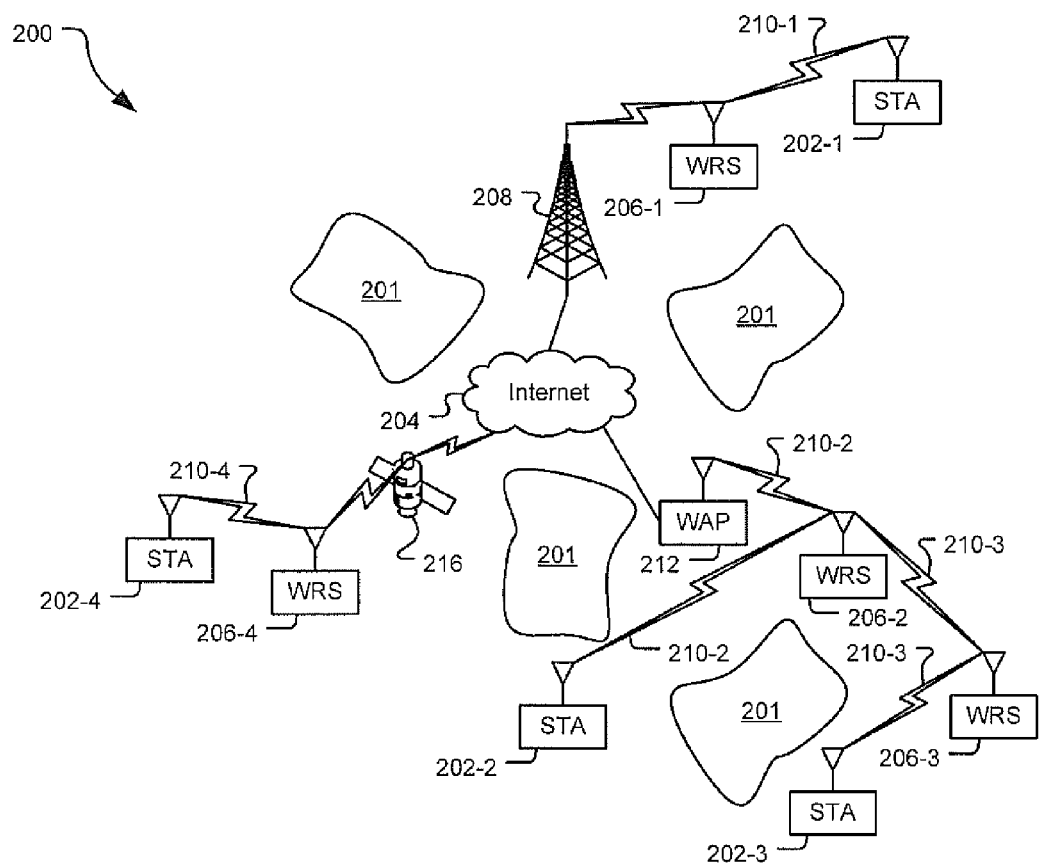
FIG. 3 is a functional block diagram of a geographical area populated with a plurality of combination WLAN access point/WLAN repeater (WRS) modules.

Referring now to FIG. 3, one of several embodiments of an improved WLAN system 200 is shown. WLAN system 200 is deployed over a geographic area that may include masses 201 which absorb and/or block RF communication channels and/or that may be too large to reasonably cover with a wireless network. Examples of masses 201 include buildings, land masses, and/or atmospheric components. First through fourth wireless STAs 202-1, . . . , 202-4 access a distributed communication system 204, such as the Internet, through various communications paths that are described below in more detail.

A plurality of combination WLAN repeater/station (WRS) modules 206 are interspersed throughout the geographic area.

Each WRS module 206 is associated with a mobile platform that includes a power supply such as a battery. Examples of mobile platforms include automobiles, trucks, motorcycles, boats, and/or the like. The mobile platform may selectively enable services to other mobile platforms depending upon a state of charge of a battery. For example, an automobile may provide access as long as the battery state of charge is above a threshold.

WRS modules 206 selectively operate in one of a STA mode and a repeater mode. In some implementations WRS modules 206 can include a wireless telephone transceiver that is used to access the distributed communication system 204 via an internet service provider (ISP). WRS modules 206 that include the wireless telephone transceivers can also operate in a WAP mode and provide access to distributed communication system 204 for other STAs 202 and WRS modules 206.

A first WRS module 206-1 operates in the WAP mode and establishes a wireless link with distributed communication system 204 via a cellular telephone tower 208. First WRS module 206-1 associates with first STA 202-1 and provides it with wireless access to distributed communication system 204 via a first communication channel 210-1. First WRS module 206-1 and first STA 202-1 comprise a first WLAN subnetwork.

A second WRS module 206-2 operates in the repeater mode and bridges a second communication channel 210-2 around one of masses 201 to WAP 212, which communicates with distributed communication system 204. In some embodiments the repeater mode includes a transponder mode that uses different frequencies to transmit and receive RF signals in the bridged second communication channel 210-2. In other embodiments the repeater mode includes a multiplexing mode that uses the same frequency at different times to transmit and receive in the bridged second communication channel 210-2.

A second STA 202-2 accesses distributed communication system 204 via a WRS 206-2, WAP 212 and bridged communication channel 210-2. A third STA 202-3 accesses distributed communication system 204 via a third communication channel 210-3 that is bridged to second WRS module 206-2 via a third WRS module 206-3. Third WRS module 206-3 is also operating in the repeater mode. Second WRS module 206-2, second STA 202-2, third STA 202-3, and third WRS module 206-3 comprise a second WLAN subnetwork.

A fourth WRS module 206-4 operates in the WAP mode and establishes a wireless link with distributed communication system 204 via a satellite 216. Fourth WRS module 206-4 is associated with fourth STA 202-4 and provides it with wireless access to distributed communication system 204 via a fourth communication channel 210-4. Fourth WRS module 206-4 and fourth STA 202-4 comprise a third WLAN subnetwork.

Since the WRS modules 206 are associated with mobile platforms, they may continuously and/or periodically move about and provide WLAN access to geographical areas that would otherwise not have coverage. WRS modules 206 can be incorporated in a substantial percentage of mobile platforms.

Figure 4A:
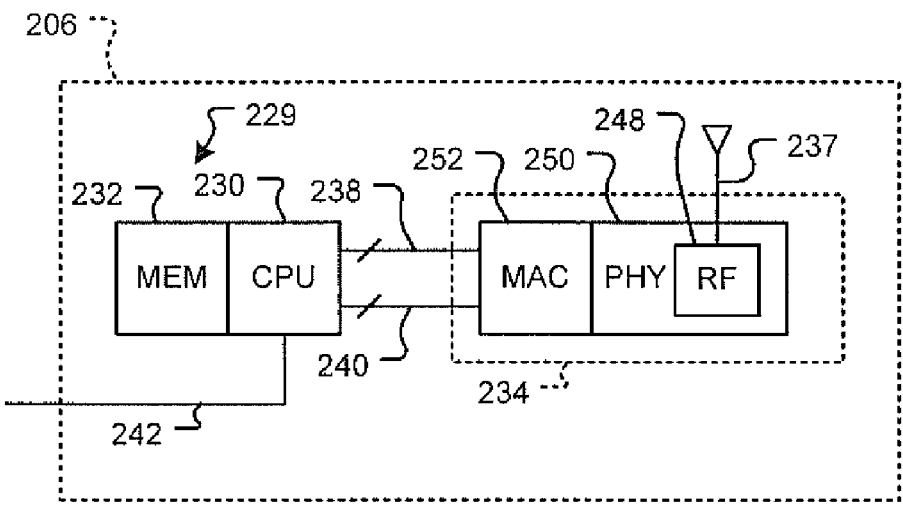
FIG. 4A is a functional block diagram of a WRS module that includes a WLAN transceiver.

Referring now to FIG. 4A, one of several embodiments of a WRS module 206 is shown. A control module 229 may have a central processing unit (CPU) 230 that communicates with memory 232. A WLAN transceiver module 234 may include an antenna 237 that communicates over wireless communication channels 210 (FIG. 3). In some embodiments WLAN transceiver module 234 is compliant with at least one of Institute of Electrical and Electronics Engineers (IEEE) standards 802.11, 802.11a, 802.11b, 802.11g, 802.11h, 802.11n, 802.16, and 802.20, which are hereby incorporated by reference in their entirety. In some embodiments WLAN transceiver module 234 is compliant with a Bluetooth specification published by the Bluetooth Special Interest Group, which is hereby incorporated by reference in its entirety.

Memory 232 includes computer instructions for the methods that are described below. CPU 230 executes the computer instructions to determine whether WRS module 206 operates in the repeater mode or the STA mode. CPU 230 communicates control signals over a control signal bus 240 to configure WLAN transceiver module 234 and wireless telephone transceiver 236 (shown in FIG. 4B) to operate in the determined mode.

CPU 230 receives a usage signal 242 that is generated by the mobile platform. Usage signal 242 indicates whether the mobile platform is being used by a user and/or whether devices associated with the mobile platform are transmitting or receiving packets. For example in a vehicle, usage signal 242 can be generated by a host device when the host needs to access the wireless network, a park/neutral switch associated with a drivetrain of the vehicle, a vehicle speed signal generated by a speedometer of the vehicle, and/or an ignition switch of the vehicle. When the mobile platform includes a portable electronic device such as a cellular telephone, laptop computer, PDA, and the like, usage signal 242 can be generated by an idle timer, a power switch, and the like. CPU 230 applies usage signal 242 to the methods described below.

WLAN transceiver module 234 includes a physical layer module (PHY) 250 that communicates with a media access controller (MAC) module 252. MAC module 252 interfaces with CPU 230 via a data bus 238 and a control signal bus 240. PHY 250 includes an RF module 248 that sends and receives WLAN packets via antenna 237. The WLAN packets can include address information that is compliant with internet protocol IPv6. WRS module 206 uses the address information to route the WLAN packets to destination WLAN subnetworks.

Figure 4B:
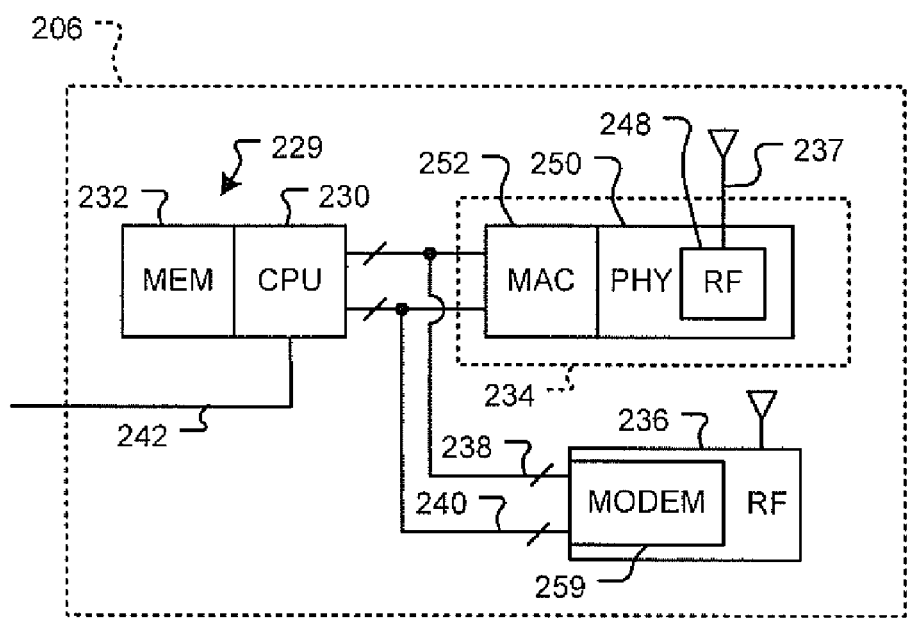
FIG. 4B is a functional block diagram of a WRS module that includes a WLAN transceiver and a wireless telephone transceiver.

Referring now to FIG. 4B, a WRS module 206 is shown that includes the components of FIG. 4A together with a wireless telephone transceiver 236. Wireless telephone transceiver 236 can include a cellular telephone transceiver, a metropolitan area network transceiver, a satellite ground station transceiver, and/or the like. Wireless telephone transceiver 236 can also include a modem 259 that translates between a digital format used by data bus 238 and a modulated RF carrier format that is used in wireless telephone systems. Wireless telephone transceiver 236 interfaces with CPU 230 via data bus 238 and control signal bus 240.

Memory 232 includes additional computer instructions to determine whether WRS module 206 operates in one of a WAP mode, the repeater mode, or the STA mode. CPU 230 communicates control signals over a control signal bus 240 to configure WLAN transceiver module 234 and wireless telephone transceiver 236 to operate in the determined mode.

Figure 5:
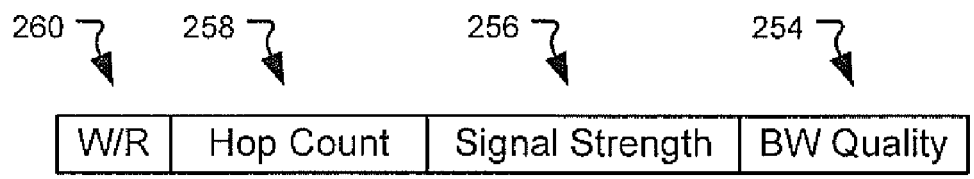
FIG. 5 is a WLAN protocol message used by a WRS module.

Referring now to FIG. 5, one of several embodiments of protocol message fields are shown that are communicated by WLAN transceiver module 234. The protocol message fields are included together or separately in a portion of the WLAN packets and indicate operating conditions of WRS module 206. It should be appreciated by one skilled in the art that the protocol message fields can include various numbers of bits to provide desired degrees of resolution in each field.

A bandwidth (BW) quality field 254 may indicate, for example, a percentage of a maximum or minimum bandwidth that an associated WRS module 206 can provide. A signal strength field 256 indicates an RF signal strength received at antenna 237. A hop count field 258 indicates a number of other WRS modules 206 and/or WAPs 212 in the communication channel 210 to distributed communication system 204 (FIG. 3). A WAP/repeater mode (W/R) field 260 indicates whether WRS module 206 is operating in the WAP mode or repeater mode. Other WRS modules 206 operating in the STA mode or the repeater mode and STAs 202 can use the protocol message fields 254-260 to determine whether to associate with the WRS module 206 that generated the message fields. For example, WRS modules 206 operating in the STA mode or the repeater mode and STAs 202 can implement a method that requires signal strength field 256 and/or BW quality field 254 be below associated predetermined values before associating with a particular WRS module 206. Such a method can provide a degree of load leveling and distribute the WLAN packets somewhat evenly across a mesh of WRS modules 206.

Figure 6:
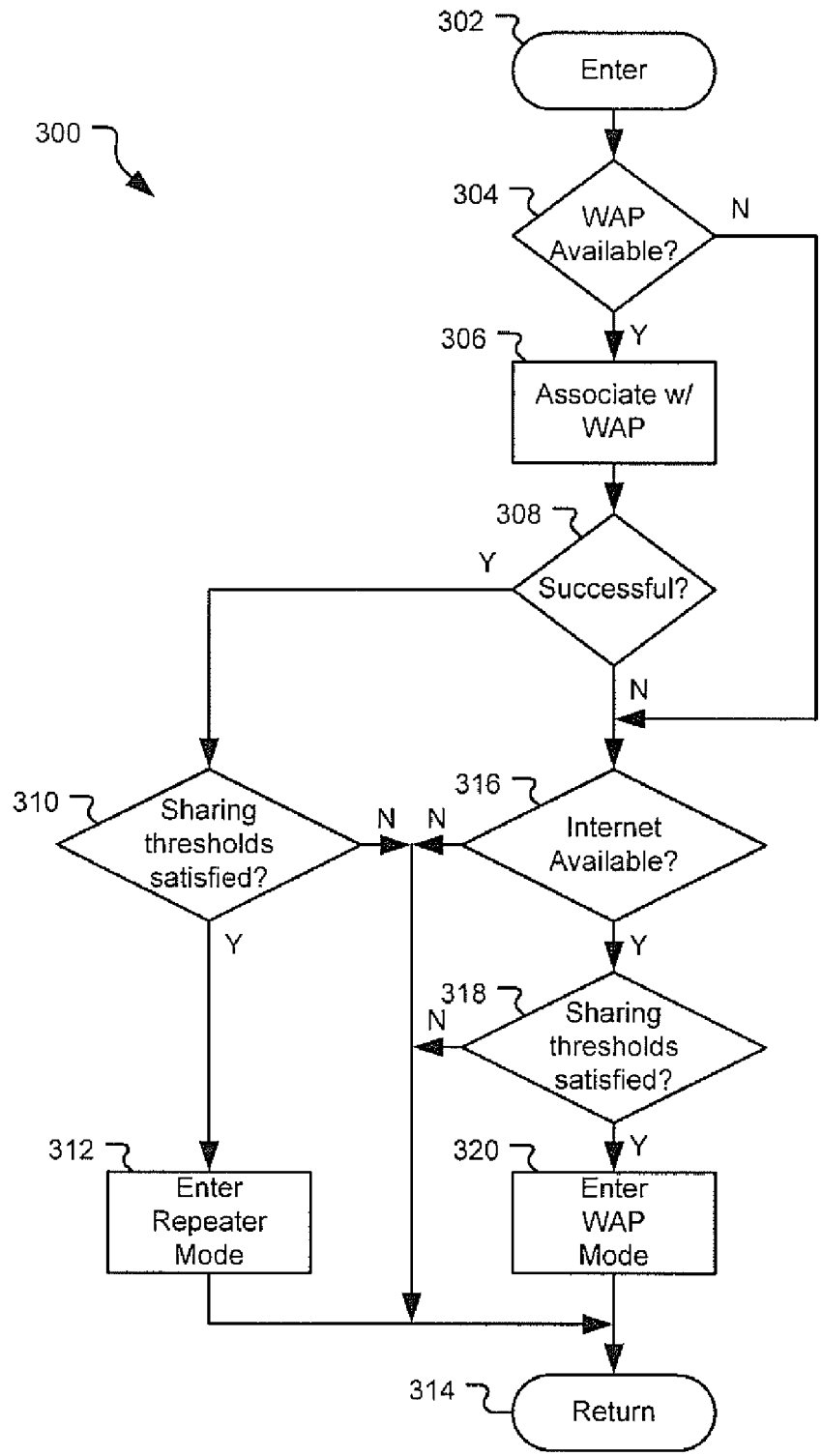
FIG. 6 is a flowchart of a first method used by a WRS module to select an operating mode.

Referring now to FIG. 6, one of several embodiments is shown of a method 300 that determines whether WRS module 206 operates in the WAP mode or the repeater mode. In some embodiments method 300 is only executed when usage signal 242 indicates that mobile platform is not being used. Method 300 can be implemented as computer instructions that are stored in memory 232 (FIG. 4) and executed by CPU 230.

Control enters at block 302 and immediately proceeds to decision block 304 to determine whether a WAP 212 is available via WLAN transceiver module 234. If so then control proceeds to block 306 and attempts to associate with the available WAP 212. Control then proceeds to decision block 308 and determines whether the attempted association from block 306 was successful. If so then control proceeds to decision block 310 and determines whether WRS module 206 may share its access to WAP 212 with other WRS modules 206 or STAs 202. In some embodiments the determination can be based on whether the association with WAP 212 incurs more than a predetermined monetary expense and/or whether WRS module 206 has sufficient unused bandwidth available. If the result from decision block 310 is affirmative then control proceeds to block 312 and enters the repeater mode. Control then returns to other processes via return block 314. On the other hand, if the result from decision block 310 is negative then control exits without entering the repeater mode. In some embodiments control can enter the host mode after exiting the negative branch of decision block 310.

If the attempted association from block 306 was unsuccessful then control proceeds from decision block 308 to decision block 316. In decision block 316 control determines whether wireless telephone transceiver 236 can access distributed communication system 204. If WRS module 206 does not include wireless telephone transceiver 236 then control immediately exits. Control also exits when wireless telephone transceiver 236 is unable to access distributed communication system 204.

If wireless telephone transceiver 236 is able to associate with distributed communication system 204, then control braches from decision block 316 to decision block 318. In decision block 318 control determines whether WRS module 206 may share its access to distributed communication system 204 with other WRS modules 206 or STAs 202. In some embodiments the determination can be based on whether the wireless telephone connection to distributed communication system 204 incurs more than a predetermined monetary expense and/or whether WRS module 206 has sufficient unused bandwidth available. If the result from decision block 318 is affirmative then control proceeds to block 3320 and enters the WAP mode. Control then returns to other processes via return block 314. On the other hand, if the result from decision block 318 is negative then control exits through block 314 without entering the WAP mode.

It should be appreciated that the branching in decision blocks 310 and 318 may be based on whether WRS module 206 has been configured to share its connection to distributed communications system 204. WRS module 206 may also share its connection only if the requesting mobile platform also enables sharing with other mobile platforms. In other words, by sharing its own wireless network resources, the WRS module 206 will have access to wireless networks provided by other mobile platforms.

Figure 7:
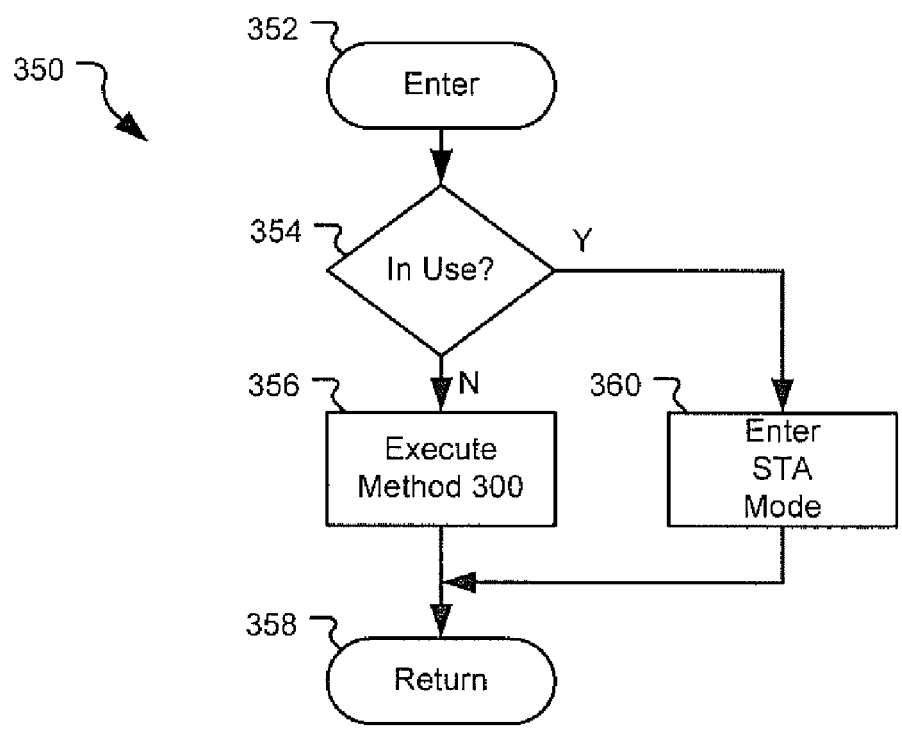
FIG. 7 is a flowchart of a second method used by a WRS module to select an operating mode.

Referring now to FIG. 7 a second method 350 is shown that determines whether WRS module 206 should enter the STA mode. Method 350 can be implemented as computer instructions that are stored in memory 232 (FIG. 4) and executed by CPU 230.

Control enters block 352 and immediately proceeds to decision block 354. Decision block 354 determines whether the mobile platform is in use based on usage signal 242 (FIG. 4). If the mobile platform is not in use then control branches to block 356 and enters one of the WAP and repeater modes based on method 300. Control then proceeds from block 356 to return block 358 and continues with other processes.

If control determines that the mobile platform is in use in decision block 354 then control branches to block 360 and enters the STA mode. Control then proceeds from block 360 to return block 358 and continues with other processes.

Figure 8A:
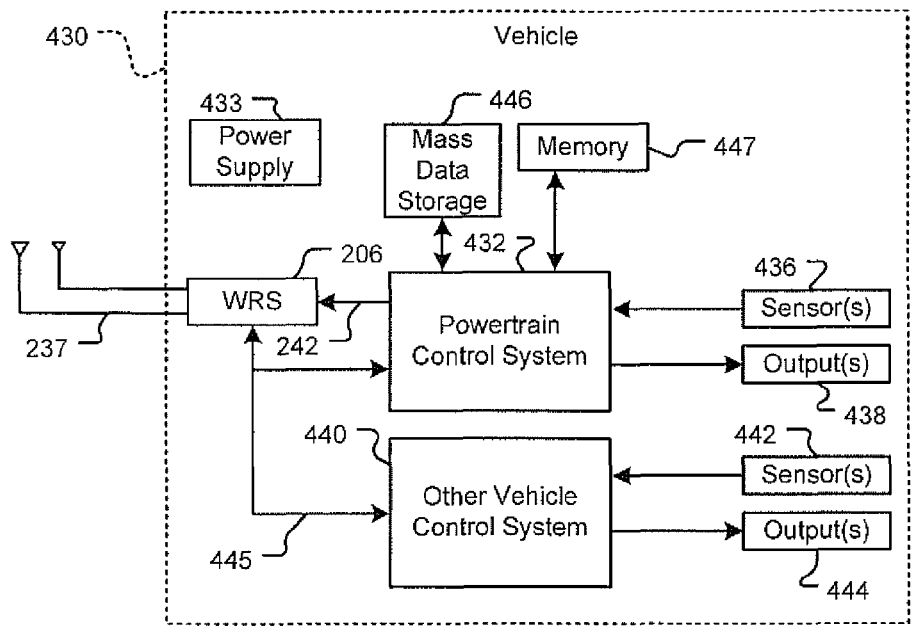
FIG. 8A is a functional block diagram of a vehicle control system.
Figure 8B:
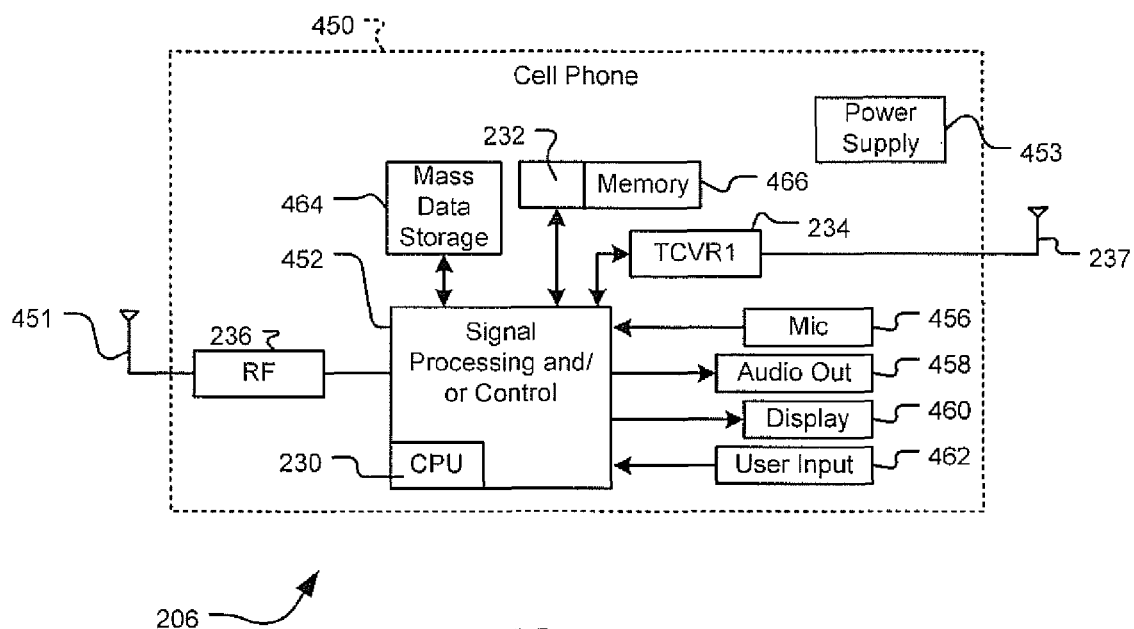
FIG. 8B is a functional block diagram of a cellular phone.

Referring now to FIGS. 8A and 8B, various exemplary implementations of WRS module 206 are shown. Referring now to FIG. 8A, WRS module 206 may be implemented in a vehicle 430. Vehicle 430 includes a powertrain control system 432 that receives inputs from one or more sensors 436 such as temperature sensors, pressure sensors, rotational sensors, airflow sensors and/or any other suitable sensors appropriate for generating usage signal 242 and/or one or more output control signals 438 such as engine operating parameters, transmission operating parameters, and/or other control signals. WRS module 206 communicates with powertrain control system 432 via a vehicle network 445. Usage signal 242 can also be communicated to WRS module 206 via vehicle network 445.

Vehicle network 445 can also communicate with another control system 440. The control system 440 can receive signals from input sensors 442 and/or output control signals to one or more output devices 444. In some implementations, the control system 440 may be part of a body control system, an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may be associated with memory 447 such as RAM, ROM, low latency nonvolatile memory such as flash memory and/or other suitable electronic data storage. The powertrain control system 432 also may support connections with distributed communication system 204 via WRS module 206.

The powertrain control system 432 may communicate with mass data storage 446 that stores data in a nonvolatile manner. The mass data storage 446 may include optical and/or magnetic storage devices for example hard disk drives (HDD), redundant array of independent disks (RAID), and/or DVDs and the like. The HDD may be a mini HDD that includes one or more platters having a diameter that is smaller than approximately 1.8". The vehicle 430 may include a power supply 433, such as a battery, that provides at least a portion of the power to WRS module 206, powertrain control system 432, and control system 440.

Referring now to FIG. 8B, WRS module 206 can be integrated with a cellular phone 450. CPU 230 can be included with other signal processing and/or control circuits, which are generally identified at 452. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example HDD, RAID, and/or DVDs and the like. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. Memory 232, which is coupled to CPU 230, can be implemented in a portion of memory 466. The cellular phone 450 also may support connections with a WLAN communication channel via WLAN transceiver 234 and antenna 237. The cellular phone 450 can access the distributed communication system 204 via a wireless telephone connection established through wireless telephone transceiver 236. The cellular telephone 450 may include a power supply 453, such as a battery.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A wireless local area network module, comprising:
an input configured to receive a control signal, wherein the control signal indicates whether a vehicle is in a parked position; and
a wireless local area network transceiver associated with the vehicle, wherein the wireless local area network transceiver is configured to
receive data packets via a first wireless communication channel, and in response to the control signal indicating that the vehicle is in a parked position, repeat the data packets over the first wireless communication channel, wherein the control signal is based on at least one of: an ignition signal, a vehicle speed signal, and a gear indicator signal.

2. The wireless local area network module of claim 1, wherein the wireless local area network transceiver is configured to repeat the data packets further based on an expense associated with communicating over the first wireless communication channel.

3. The wireless local area network module of claim 1, wherein at least a portion of the data packets includes performance data associated with the first wireless communication channel.

4. The wireless local area network module of claim 3, wherein the wireless local area network transceiver is configured to repeat the data packets further based on the performance data.

5. The wireless local area network module of claim 1, further comprising:
a wireless telephone transceiver configured to communicate over a second wireless communication channel; and
a central processing unit configured to route the data packets between the wireless local area network transceiver and the wireless telephone transceiver.

6. The wireless local area network module of claim 5, wherein the wireless telephone transceiver includes a terrestrial-based wireless telephone transceiver or a satellite-based wireless telephone transceiver.

7. The wireless local area network module of claim 1, wherein the wireless local area network transceiver is otherwise compliant with the Institute of Electrical and Electronics Engineers (IEEE) standard 802.11n.

8. The wireless local area network module of claim 1, wherein the wireless local area network transceiver is otherwise compliant with at least one of IEEE standards 802.11, 802.11a, 802.11b, 802.11g, 802.11h, 802.16, and 802.20, and Bluetooth Special Interest Group's (SIG) standard.

9. A method, comprising:
receiving a control signal, wherein the control signal indicates whether a vehicle is in a parked position;
receiving, at a wireless local area network transceiver associated with the vehicle, data packets via a first wireless communication channel; and
in response to the control signal indicating that the vehicle is in a parked position, repeating the data packets over the first wireless communication channel, wherein the control signal is based on at least one of an ignition signal, a vehicle speed signal, and a gear indicator signal.

10. The method of claim 9, further comprising repeating the data packets based on an expense associated with communicating over the first wireless communication channel.

11. The method of claim 9, wherein at least a portion of the data packets includes performance data associated with the first wireless communication channel, the method further comprising repeating the data packets based on the performance data.

12. The method of claim 9, further comprising:
communicating over a second wireless communication channel using a wireless telephone transceiver; and
routing the data packets between the first wireless communication channel and the second wireless communication channel.

13. The method of claim 12, wherein the wireless telephone transceiver includes a terrestrial-based wireless telephone transceiver or a satellite-based wireless telephone transceiver.

14. The method of claim 9, wherein the wireless local area network transceiver is otherwise compliant with the Institute of Electrical and Electronics Engineers (IEEE) standard 802.11n.

* * * * *